(12) United States Patent
Lee

(10) Patent No.: US 7,801,757 B2
(45) Date of Patent: Sep. 21, 2010

(54) COMPUTER IMPLEMENTED CUSTOMER VALUE MODEL IN AIRLINE INDUSTRY

(75) Inventor: Yung-Seop Lee, Chatham, NJ (US)

(73) Assignee: Teradata US, Inc., Miamisburg, OH (US)

(*) Notice: Subject to any disclaimer, the term of this patent is extended or adjusted under 35 U.S.C. 154(b) by 3039 days.

(21) Appl. No.: 09/782,149

(22) Filed: Feb. 14, 2001

(65) Prior Publication Data

US 2002/0138332 A1 Sep. 26, 2002

(51) Int. Cl.
G06F 17/30 (2006.01)
(52) U.S. Cl. .................................................. 705/10
(58) Field of Classification Search ............... 705/11, 705/10
See application file for complete search history.

(56) References Cited

U.S. PATENT DOCUMENTS

| | | | |
|---|---|---|---|
| 5,251,131 A | 10/1993 | Masand et al. | 364/419.08 |
| 5,521,813 A | 5/1996 | Fox et al. | 364/401 |
| 5,627,973 A | 5/1997 | Armstrong et al. | 395/210 |
| 5,774,883 A | 6/1998 | Andersen et al. | 205/38 |
| 5,970,464 A | 10/1999 | Apte et al. | 705/4 |
| 5,974,396 A * | 10/1999 | Anderson et al. | 705/10 |
| 6,003,013 A | 12/1999 | Boushy et al. | 705/10 |
| 6,012,056 A | 1/2000 | Menlove | 707/5 |
| 6,018,738 A | 1/2000 | Breese et al. | 707/100 |
| 6,061,658 A * | 5/2000 | Chou et al. | 705/10 |
| 6,567,786 B1 * | 5/2003 | Bibelnieks et al. | 705/14 |
| 6,604,084 B1 * | 8/2003 | Powers et al. | 705/11 |
| 6,925,441 B1 * | 8/2005 | Jones et al. | 705/10 |
| 7,003,476 B1 * | 2/2006 | Samra et al. | 705/10 |
| 7,006,979 B1 * | 2/2006 | Samra et al. | 705/10 |
| 7,010,495 B1 * | 3/2006 | Samra et al. | 705/10 |
| 7,152,039 B1 * | 12/2006 | Cheng et al. | 705/10 |
| 2002/0042742 A1 * | 4/2002 | Glover et al. | 705/14 |

FOREIGN PATENT DOCUMENTS

WO   WO 9922328 A1 * 5/1999

OTHER PUBLICATIONS

Hughes, Arthur M. Making Your Database Pay Off Using Recency Frequency and Monetary Analysis. Mar. 7, 2000. Database Marketing Institute. Dec. 29, 2004<http://webarchive.org/web/20000307195831/http://dbmarketing.com/articles/Art104.htm>.*

(Continued)

*Primary Examiner* — Jonathan G. Sterrett
*Assistant Examiner* — Peter Choi
(74) *Attorney, Agent, or Firm* — Lowe, Hauptman, Gilman & Berner LLP

(57) ABSTRACT

A computer implemented method of evaluating customers in the airline industry in a given period is disclosed. Records of each customer' contribution factors, which include net revenue and number of flights, are first obtained. A score is then assigned for each of the attribute values. The records are consecutively sorted by the assigned scores, first for the net revenue, then for the number of flights. The records are further sorted by the raw values of the net revenue and number of flights, preferably until, records having different net revenue and/or number of flights have been sorted to different ranks. Finally, an evaluation score is assigned to each record which has been sorted.

13 Claims, 2 Drawing Sheets

OTHER PUBLICATIONS

Hughes, Arthur M. Making Profits with What is Already in Your Database. Jan. 18, 2000. Database Marketing Institute. Dec. 29, 2004 <http://web.archive.org/web/20000118200419/http://dbmarketing.com/articles/Art126.htm>.*

Hughes, Arthur M. Quick Profits with RFM Analysis. Feb. 8, 1999. Database Marketing Institute. Dec. 29, 2004 <http://web.archive.org/web/19990208211536/www.dbmarketing.com/articles/rfmtools.htm>.*

Gilyeat, Ian R., and Arthur M. Hughes. Database Marketing Drives New Corporate Strategy. Jan. 18, 2000. Database Marketing Institute. Dec. 29, 2004 <http://web.archive.org/web/20000118045659/http://dbmarketing.com/articles/Art178.htm>.*

Database Marketing Institute Software. Feb. 3, 1999. Database Marketing Institute.Dec. 29, 2004 <http://web.archive.org/web/19990203011752/www.dbmarketing.com/ams.html>.*

Weber, Alan. Building a Customer Value Index. Jan. 18, 2000. Database Marketing Institute. Dec. 29, 2004 <http://web.archive.org/web/20000118093527/http://dbmarketing.com/articles/Art162.htm>.*

Hoekstra, Janny C.; Leeflang, Peter S.; Wittink, Dick R. "The Customer Concept: The Basis for a New Marketing Paradigm". Jun. 1999. Journal of Market Focused Management. vol. 4, Issue 1.*

Frawley, Andrew; Thearling, Kurt. "Increasing Customer Value by Integrating Data Mining and Campaign Management Software". Feb 1999. Direct Marketing. vol. 61, Issue 10. pp. 49-53.*

Choi, Jungwhan; Cooper, Kevin; Hamner, Phil. "Identifying Target Customers". Summer 1998. Marketing Research. vol. 10, Issue 2. pp. 22-26.*

Miglautsch, John R. "Thoughts on RFM Scoring". May 22, 2000. Journal of Database Marketing. vol. 8, Issue 1. pp. 67-72.*

Hoekstra, Janny C.; Huizingh, Eelko K. R. E; "The Lifetime Value Concept in Customer-Based Marketing". 1999. Journal of Market Focused Management. vol. 3, Nos. 3-4. pp. 257-274.*

Emmelhainz, Margaret Anne; Kavan, C. Bruce; "Using Information as a Basis for Segmentation and Relationship Marketing: A Longitudinal Case Study of a Leading Financial Services Firm". 1999. Journal of Market Focused Management. Volume , Issue 2. pp. 161-177.*

Hughes, Arthur Middleton. "Boosting Response with RFM". May 1996. American Demographics. pp. 4-10.*

Orme, George. "Contact Strategy: Segmenting Your Targets". Oct. 31, 1998. Direct.*

* cited by examiner

|  | Attribute 1 | Attribute 2 | ... | Attribute n |
|---|---|---|---|---|
| Record 1 | $Data_{1,1}$ | $Data_{1,2}$ | ... | $Data_{1,n}$ |
| Record 2 | $Data_{2,1}$ | $Data_{2,2}$ | ... | $Data_{2,n}$ |
| ... | ... | ... | ... | ... |
| Record m | $Data_{m,1}$ | $Data_{m,2}$ | ... | $Data_{m,n}$ |

COMPUTER IMPLEMENTED CUSTOMER VALUE MODEL IN AIRLINE INDUSTRY

FILED OF THE INVENTION

The present invention relates generally to a computer implemented method and apparatus for evaluating records indicative of contributions of a customer to a business, such as an airline.

BACKGROUND OF THE INVENTION

Finding highly valued customers is an important objective of any business in order to improve upon a company's profitability. Not only do companies wish to acquire highly valued customers, it is equally important to identify, retain and conduct additional business with their existing highly valued customers. There has long been a need for customer value models as a critical component in the field of customer relationship management. When the most profitable or highly valued customers to a company have been identified by a customer value model, several models such as retention, acquisition, or growth models can be developed that target these highly valued customers. There are no such known customer value models in the airline industry of which the applicant is aware.

Typically, a customer's value is measured by the profitability or net revenue contribution (which is revenue less cost). Though this trend has been observed in many industries, it may not be true in the airline industry where customers who contribute higher net revenue are not necessarily the most frequent fliers. This will be illustrated with an example of two customers, one of whom flies internationally once a year with high fares for vacation, and the other flies more often within the United States for business. The first customer with the international vacation travel will generate more net revenue than the second customer, despite the fact that the latter flies much more frequently. However, the second customer could be more valuable to the airline because this customer is more likely to fly often and generate more revenue in the near future than the first customer, who may generate more revenue now but less in the future. Therefore, developers of an accurate customer value model in the airline industry should not ignore the number of flights taken by each customer in a given evaluation period.

Another factor to be considered when determining a customer's value is the miles flown. Mileage is known to be proportional to the number of flights, and can be presented by, or combined with, the number of flights factor.

SUMMARY OF THE INVENTION

It is an object of the present invention to provide a computer based implemented method and apparatus for evaluating records based on data therein, which is especially suitable for evaluating contributions of a customer to a business.

It is a further object of the present invention to provide a computer implemented method and apparatus for evaluating customer contributions in the airline industry, which takes into account both net revenue and flying frequency to produce accurate customer values.

These and other objects of the present invention are achieved by a computer implemented method of evaluating a plurality of records, wherein each record has a first and a second attributes with associated attribute values. In accordance with the method, a score is assigned for each of the attribute values. Next, the records are consecutively sorted by the assigned scores, first for the first attribute, then for the second attribute. In the subsequent step, the records are further sorted by the attribute values, preferably, until records having different attribute values have been sorted to different ranks. Finally, an evaluation score is assigned to each record which has been sorted.

In accordance with an aspect of the invention, the scores and evaluation scores are assigned by first breaking the records into groups, and then assigning some score to records in each of the groups.

The foregoing objects of the present invention are also achieved by a computer implemented method of evaluating customers in the airline industry in a given period. The method comprises the step of obtaining records of each customer's contribution factors which include net revenue and number of flights. In accordance with the method, a score is assigned for each of the attribute values. Next, the records are consecutively sorted by the assigned scores, first for the net revenue, then for the number of flights. In the subsequent step, the records are further sorted by the raw values of the net revenue and number of flights, preferably, until records having different net revenue and/or number of flights have been sorted to different ranks. Finally, an evaluation score is assigned to each record which has been sorted.

The foregoing objects of the present invention are also achieved by a computer architecture for evaluating a plurality of records, wherein each record has first and second attributes with associated attribute values. The computer architecture comprises means for first assigning a score for each of the attribute values. Means for first sorting and means for second sorting are provided to consecutively sort the records by the assigned scores, first for the first attribute, then for the second attribute. Means for third sorting is also provided to further sort the records by the attribute values, preferably, until records having different attribute values have been sorted to different ranks. Means for second assigning, assigns an evaluation score to each record which has been sorted.

The foregoing objects of the present invention are also achieved by a computer system for evaluating a plurality of records, wherein each record has first and second attributes with associated attribute values. The computer system comprises a processor and a memory coupled to the processor. The memory has stored therein sequences of instructions, which, when executed by the processor, cause the processor to assign a score for each of the attribute values. Next, the processor consecutively sorts the records by the assigned scores, first for the first attribute, then for the second attribute. The processor further sorts the records by the attribute values, preferably, until records having different attribute values have been sorted to different ranks. Finally, the processor assigns an evaluation score to each record which has been sorted.

The foregoing objects of the present invention are also achieved by an article, for use in evaluating a plurality of records, wherein each record has a first and a second attributes with associated attribute values. The article comprises at least one sequence of machine readable instructions in machine readable form. The execution of the instructions by one or more processors causes the one or more processors to assign a score for each of the attribute values. Next, the one or more processors consecutively sort(s) the records by the assigned scores, first for the first attribute, then for the second attribute. The one or more processors further sort(s) the records by the attribute values, preferably, until records having different attribute values have been sorted to different ranks. Finally, the one or more processors assign(s) an evaluation score to each record which has been sorted.

Object

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figures 1, 2:
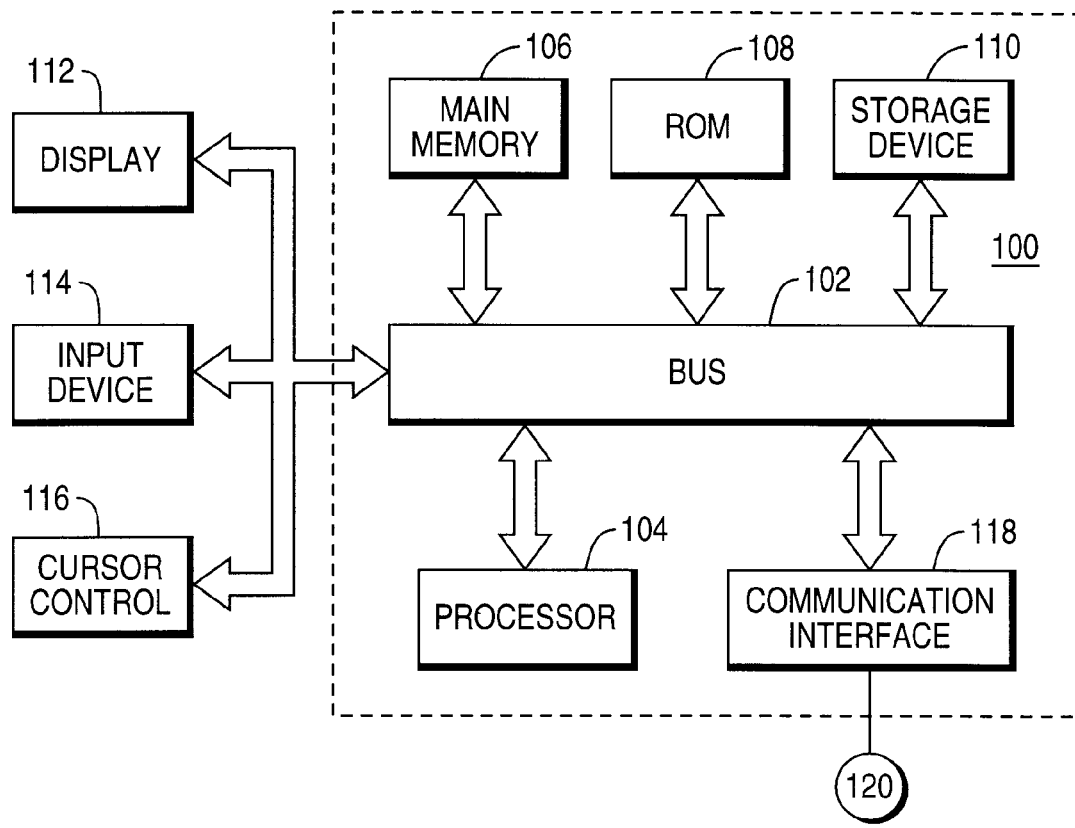
FIG. 1 is a high-level block diagram of an exemplary computer system with which the present invention can be implemented.
FIG. 2 is an illustration of a database to be manipulated on in accordance with the present invention.

A method of and apparatus for evaluating individual customer contributions within the airline industry according to the present invention are described. In the following detailed description, for purposes of explanation, numerous specific details are set forth in order to provide a thorough understanding of the present invention. It will be apparent, however, that the present invention may be practiced without these specific details. In other instances, well-known structures and devices are shown in block diagram form in order to simplify the drawing.

FIG. 1 is a high-level block diagram illustrating an exemplary computer system 100 with which the present invention can be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 may also be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

According to one embodiment of the invention, a variety of information and services are provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, DVD-ROM, or any other optical medium, punch cards, paper tape, or any other physical medium with patterns of holes, a RAM, a PROM, an EPROM, a FLASH-EPROM, or any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card, a digital subscriber line (DSL) card, a cable modem, or a telephone modem to provide a data communication connection to a corresponding type of communication line. As another example, communication interface 118 may be a local area network (LAN) card to provide a data communication connection to a compatible LAN. Wireless links may also be implemented. In any such implementation, communication interface 118 sends and receives, through a data communication connection 120, electrical, electromagnetic or optical signals which carry digital data streams representing various types of information. Of a particular note, the communications through interface 118 may permit transmission or receipt of data.

FIG. 2 is an illustrative database 200 which contains data to be manipulated in accordance with the present invention. The database 200 comprises a number of rows and columns of information, for example, m rows and n columns. A row corresponds to a record which is generally unique to a customer. As shown in FIG. 2, there are m records corresponding to m customers in the database 200. A column corresponds to an attribute of a record. As shown in FIG. 2, a record may have up to n attributes, corresponding to n columns. The intersection of a row and a column comprises a cell that may contain data for a particular record (customer) related to a particular attribute. As shown in FIG. 2, record/customer 1 has $data_{1,1}$ related to attribute 1, $data_{1,2}$ related to attribute 2, and so on. The last record/customer m has $data_{m,n}$ related to the last attribute n. A person of ordinary skill in the art may envision database structures of types other than the one of the database 200.

Data of a cell can be input, e.g. keyed in by an operator, imported from an existing database, transmitted from other systems, or entered in any manner known in the art, into the database 200. The data can also be internally interpolated based on the information which have been already stored in the database 200, alone or together with information from other sources. The data can be of any format which is suitable for sorting and evaluating operations by the present invention. The appropriate data formats include, but are not limited to, number, currency, date, time, text, sound, and image. The real data representing customer contributions with respect to the airline industry will probably look like the following Table 1:

TABLE 1

Exemplary data representing customer contribution in the airline industry

| Record/Customer | Net Revenue (CV) | No. of Flights (FV) | Net Contribution Score (CS) | Gross Frequency Score (FS) | Evaluation Score | CV/FV | CV*FV |
|---|---|---|---|---|---|---|---|
| 1 | 850 | 2 | 4 | 1 | 82 | 425 | 1700 |
| 2 | 682 | 1 | 4 | 1 | 82 | 682 | 682 |
| 3 | 450 | 4 | 3 | 3 | 72 | 112.5 | 1800 |
| 4 | 503 | 3 | 3 | 3 | 74 | 167.6 | 1509 |
| 5 | 122 | 6 | 1 | 4 | 61 | 20.3 | 732 |
| 6 | 159 | 5 | 1 | 4 | 60 | 31.8 | 795 |
| 7 | 1263 | 5 | 4 | 4 | 94 | 252.6 | 6315 |
| 8 | 2202 | 6 | 4 | 4 | 94 | 367 | 13212 |
| 9 | 510 | 5 | 3 | 4 | 79 | 102 | 2550 |
| 10 | 180 | 4 | 1 | 3 | 53 | 45 | 720 |

Table 1 has a structure similar to the structure of the database 200. In particular, there are 10 records/customers to be evaluated in the example shown in Table 1. Each customer's contribution is represented by values or scores associated with one of seven attributes listed in the header row of Table 1. Among these attributes, data for the very first two, that is Net Revenue (CV) and No. of Flights (FV), are generally input into Table 1, e.g. through a sales monitoring or account management system. Data of the remaining attributes are interpolated based on CV and FV with or without further consideration of other information sources.

Figure 3:
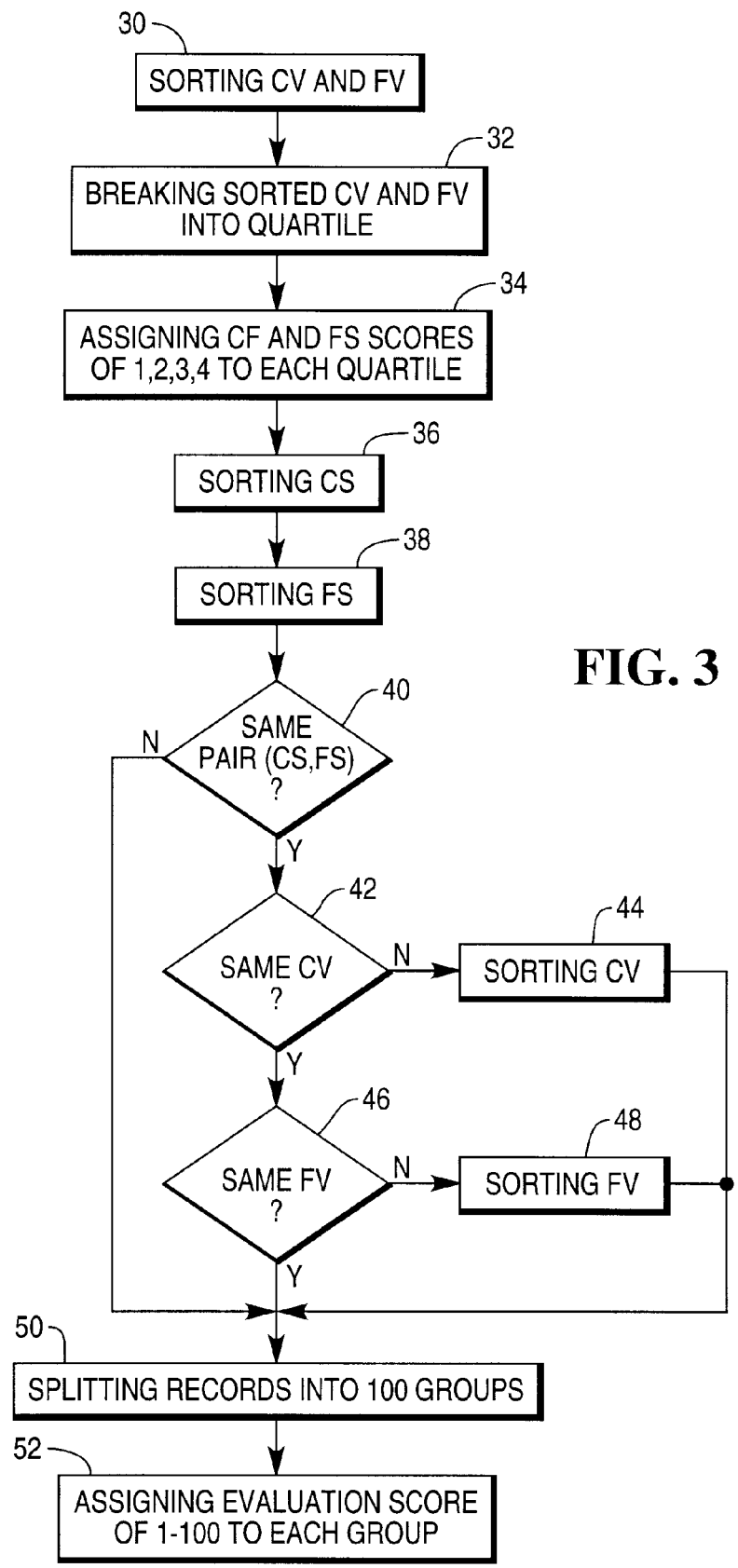
FIG. 3 is a flow chart illustrating the processes performed in accordance with an implementation of the invention.

A detailed flowchart setting forth the sequences of operations performed in accordance with the invention is shown in FIG. 3, and will be explained with reference to Table 1.

Starting from an optional auxiliary step (not shown) of obtaining data to be manipulated, processing proceeds to a first assigning step where a score is assigned for each of the record values associated with certain attributes. In the preferred embodiment, the records/customers are sorted, in step 30, in ascending order of CV or FV values. Next, in step 32, the sorted CV or FV values are split into quartiles, with the break points of 25%, 50% and 75%. If there is the same value in the break point, the processing looks for a subsequently higher value, and makes a cut at that point. In particular, CV or FV of the lowest value up to 25% are grouped into quartile 1, CV or FV of values between 25%-50% are grouped into quartile 2, CV or FV of values between 50%-75% are grouped into quartile 3, and CV or FV of values of 75% and up are grouped into quartile 4. Each quartile is then assigned a corresponding score of from 1 to 4, in step 34. In particular, all the CV or FV which belongs to quartile 1 will have the same attribute score of 1, all the CV or FV which belongs to quartile 2 will have the same attribute score of 2, and so on.

In the example illustrated in Table 1, when being sorted by CV value, customer #5 (CV=122) is ranked first, followed by customer #6 (CV=159), and customer #8 (CV=2202) is ranked last. With the break points of 200 (25%), 400 (50%) and 600 (75%), customers #5, #6 and #10 are grouped into quartile 1 and will be assigned an attribute score of 1, customers #3, #4 and #9 are grouped into quartile 3 and will be assigned an attribute score of 3, and so on. The attribute scores are stored in Table 1 as Net Contribution Score (CS). Similarly, the attribute scores which correspond to FV values are stored in Table 1 as Gross Frequency Score (FS). The CS and FS scores constitute a pair in the form of (CS,FS) which will be considered in later steps of the method of the present invention.

Obviously, other arrangements are readily contemplated in order to perform the first assigning step. For example, any desired number, e.g. other than two, of attributes may be chosen instead of just two attributes Net Revenue and No. of Flights as described above. The decision as to how many attributes and which attribute(s) are chosen will depend on the characteristics of the industry (airline or otherwise), the amount and type of data collected etc. The data related to an attribute are not necessarily sorted in ascending or descending order, and split into quartile. They may be split into any desired number of groups, based on any criterion which is suitable for that type of data. Moreover, the groups are not necessarily of equal size, as described above by the break points of 25%, 50% and 75%. The decision as to how many groups and what break points are chosen will depend on many factors, such as data sensitivity and data distribution. Likewise, the attribute scores of 1, 2, 3 and 4 are for the sake of illustration and simplicity only, and any other set of scores may be used instead.

In subsequent steps of first sorting and second sorting, the records are sorted in order of the assigned attribute scores. In the preferred embodiment, the records/customers are firstly sorted, in step 36, in ascending order of CS score. After that, the sorted records/customers are sorted a second time, in step 38, in ascending order of FS score. In other words, the pairs of scores (CS,FS) are sorted in the following order: (4,4), (4,3), (4,2), (4,1), (3,4), (3,3), . . . , (1,1). In the example illustrated in Table 1, customers #7 and #8 of (4,4) pair are ranked first, while customer #10 of (1,3) pair is ranked last.

Of a particular note, there may be records/customers which have different CV and/or FV values, but the values are close enough so that these records/customers may have the same pair of (CS,FS). For example, customers #3 and #4 in Table 1 have the same pair (3,3) even though their CV values (450 and 503, respectively) and FV values (4 and 3, respectively) are different. It is possible that several records/customers may be sorted to the same rank after sorting steps 36 and 38. If this is the case, an additional third sorting step will be invoked as a result of a return of "yes" at a verifying step 40. Otherwise, the processing moves to a final step of second assigning, at a return of "no" of the verifying step 40.

In the third sorting step, the previously sorted records are further sorted based on the original attribute values. Preferably, the third sorting step is performed until all records/customers, which have the same assigned scores but different attribute values, have been sorted to different ranks. In a preferred embodiment, the records/customers, which have the same pair of (CS,FS) but different CV values, determined in step 42, are sorted in ascending order of their corresponding CV values, in step 44. The records/customers, which have the same pair of (CS,FS) and same CV values but different FV values, determined in step 46, are sorted in ascending order of their corresponding FV values, in step 48.

In another preferred embodiment, when it has been found, in step 40, that there are records/customers having the same pair of (CS,FS), they are sorted by their CV values, without considering their FV values. If they still have the same CV values, then they are sorted by their FV values. For example, as shown in Table 1, customers #3 and #4 of the same pair (3,3) may be sorted to different ranks due to their CV values. Since these customers have different CV values, there is no need to sort further by their FV values.

One purpose of the third sorting step is to ensure that the record/customer having the highest CV and FV values among (4,4) pairs is ranked first, while the record/customer having the lowest CV and FV values among (1,1) pairs is ranked last. The records/customers, which have identical CV and FV values, and hence, the exact same pair of (CS,FS), should of course be treated equally as though they were one record/customer. The processing then moves to the final step.

Obviously, other arrangements are readily contemplated in order to perform the first, second and third sorting steps. For example, if more than two attributes are chosen in the first assigning step, additional score sorting steps may be included before performing the third sorting step to consecutively sort the records in the order based on all the attribute scores assigned. Additional value sorting steps may further be included in the third sorting step to ensure that records with different values of certain attributes should be sorted to different ranks. It is also possible for an attribute to be important only in the assigned score but not in the original values. In that case, an additional score sorting step may be needed, while a value sorting step may not be necessary.

In the final step of second assigning, an evaluation score is assigned for each record which has been sorted. In the preferred embodiment, the finally sorted records/customers are split, in step 50, into a number, e.g. 100, of groups. Each group is then assigned a corresponding evaluation score of, e.g. from 1 to 100, in step 52. The evaluation scores corresponding to each of the records/customers are stored in Table 1 under the "Evaluation Score" column.

In the preferred embodiment, the record/customer which has been ranked first in the preceding sorting steps will be assigned an evaluation score of 100, while the record/customer which has been ranked last in the preceding sorting steps will be assigned an evaluation score of 1. Obviously, other arrangements are readily contemplated in order to perform the second assigning step. For example, the finally sorted records/customers may be split into any desired number of groups, and any other set of evaluation scores may be used instead of the 1 to 100 range. As described above, the decision as to how many groups and which evaluation score sets are to be chosen will depend on many factors, such as policies prevalent within the industry at a given moment, the amount and type of data collected, data sensitivity, and data distribution.

The advantages of the evaluation methods in accordance with the present invention are obvious given the above description and discussions. For example, evaluation methods of the invention greatly simplify the solution to the stated problem by introducing and manipulating the attribute scores. Instead of the raw values. The discretized range of scores makes the data easy to interpret, especially when quartile break points are used. Moreover, applying evaluation scores in the 1 to 100 range for customer valuation tends to be a more intuitive measure.

In implementing the evaluation methods of the present invention, certain record attributes are given more weight than others. For example, it is important in the airline industry to consider both Net Revenue and flying frequency, or No. of Flights. According to an aspect of the invention, Net Revenue has a higher priority than No. of Flights, which, in some situations, may be the decisive factor in determining which customer is of higher value than the others. In the example illustrated in Table 1, customer #1 of (4,1) pair is ranked higher than customer #6 of (1,4) pair. As a result, the evaluation score of customer #1 (82) is much higher than that of customer #6 (60). This is because customer #1 has more Net Revenue even though his No. of Flights is much lower (2 times vs. 5 times of customer #6). As is apparent from this example, customers who contribute more revenue from fewer flights will always have a higher value than those who contribute less revenue but fly more frequently.

The same effect is observed in the example shown above with customers #3 and #4. They have the same pair of (3,3), but customer #4 is eventually assigned a higher evaluation score (74) than customer #3 (72) notwithstanding the fact that customer #3 flies more frequently than customer #4. This is because customer #4 has more Net Revenue than customer #3, which comes into account in the third sorting step. Although the difference of two (2) points in evaluation scores is relatively small, in certain situations it can have a big effect on customer value.

These concerns can be addressed with the following alternatives. In accordance with a first alternative method, a ratio of CV and FV values of every record/customer is calculated, and stored, for example, in Table 1 as a CV/FV value. In accordance with a second alternative method, a product of CV and FV values of every record/customer is calculated, and stored, for example, in Table 1 as a CV*FV value. The records/customers are then sorted in order of either CV/FV or CV*FV values. Optionally, the sorted records/customers are assigned an alternative evaluation score in an alternative assigning step which is similar to the second assigning step.

The first and second alternative methods may change entirely the ranking from what is seen under the "Evaluation Score" column in Table 1. According to the first alternative method, a record/customer with a high CV value and a low FV value, such as customer #2, will probably be ranked first. Conversely, customer #2 will be ranked last according to the second alternative method in which a CV value is actually weighted by its corresponding FV value. In this situation, customer #8 will be ranked first, followed by customer #7 and customer #9.

In brief, the alternative methods provide a relatively balanced ranking of customer values. The alternative methods are applicable depending on the circumstance, but they are especially suitable when the evaluation method discussed in the first part of this description is likely to produce inaccurate results for a large specific amount of data.

While there have been described and illustrated specific embodiments of the invention, it will be clear that variations in the details of the embodiments specifically illustrated and described may be made without departing from the true spirit and scope of the invention as defined in the appended claims.

What is claimed is:

1. A computer implemented method of evaluating a plurality of customer records stored in a computer database to identify high value customers to be targeted by a customer retention or reward program, each customer record having at least a first attribute and a second attribute, each of the first attribute and the second attribute having an associated attribute value, the method comprising:
   a) first sorting the plurality of customer records based on the first attribute and assigning a first discretized attribute to each customer record where the first discretized attribute is based on the sorted rank of the customer record;
   b) second sorting the plurality of customer records based on the second attribute and assigning a second discretized attribute to each customer record where the second discretized attribute is based on the sorted rank of the customer record;
   c) third sorting the plurality of customer records in to an order based on the assigned first discretized attribute scores associated with the first attribute;
   d) fourth sorting the ordered plurality of customer records resulting from the third sorting in to an order where the customer records having the same first discretized attribute scores are further sorted based on the assigned second discretized attribute scores associated with the second attribute;
   e) fifth sorting the ordered plurality of customer records resulting from the fourth sorting in to an order based on the attribute values associated with at least the first attribute and the second attribute, until customer records, which have different attribute values associated with at least the first attribute or the second attribute, have been sorted to different ranks;
   f) assigning an evaluation score to each customer record based on the rank of each customer record after the fifth sorting and independent of the discretized attribute scores; and
   g) identifying the high value customers by selecting the customer records that have the highest assigned evaluation scores.

2. The method of claim 1, wherein step (a) includes the steps of:
   (i) breaking the sorted plurality of customer records into a number of groups based on the rank of each customer record and its first attribute value; and
   (ii) for each customer record in a group, assigning the same first discretized attribute score.

3. The method of claim 1, wherein step (b) includes the steps of:
   (i) breaking the sorted plurality of customer records into a number of groups based on the rank of each customer record and its second attribute value; and
   (ii) for each customer record in a group, assigning the same second discretized attribute score.

4. The method of claim 1, wherein step (a) includes the steps of:
   (i) breaking the sorted plurality of customer records into quartiles; and
   (ii) for customer records of the same quartile, assigning one of the scores of 1, 2, 3, and 4 as the first discretized attribute.

5. The method of claim 1, wherein step (f) includes the steps of:
   (iii) splitting the customer records, which have been sorted, into a number of groups based on their current ranking; and
   (iv) assigning an evaluation score for the customer records of each group.

6. The method of claim 1, wherein step (f) includes the steps of:
   (v) splitting the customer records, which have been sorted, into 100 groups based on the current ranking of the customer records; and
   (vi) assigning an evaluation score of between 1 and 100 for customer records of each group.

7. The method of claim 1, wherein step (e) is performed until customer records, which have same assigned first and second discretized attribute scores but different attribute values associated with at least the first attribute or the second attribute, have been sorted to different ranks.

8. The method of claim 1, wherein step (b) includes the steps of:
   (i) breaking the sorted plurality of customer records into quartiles; and
   (ii) for customer records of the same quartile, assigning one of the scores of 1, 2, 3, and 4 as the second discretized attribute.

9. The method of claim 1, where the first attribute includes the revenue generated by the customer.

10. The method of claim 1, where the second attribute includes the number of purchases made by the customer.

11. A computer architecture for evaluating a plurality of customer records stored in a computer database to identify high value customers to be targeted by a customer retention or reward program, each customer record having at least a first attribute and a second attribute, each of the first attribute and the second attribute having an associated attribute value, the computer architecture comprising:
   a) means for first sorting the plurality of customer records based on the first attribute and assigning a first discretized attribute to each customer record where the first discretized attribute is based on the sorted rank of the customer record;
   b) means for second sorting the plurality of customer records based on the second attribute and assigning a second discretized attribute to each customer record where the second discretized attribute is based on the sorted rank of the customer record;
   c) means for third sorting the plurality of customer records in order based on the assigned first discretized attribute scores associated with the first attribute;
   d) means for fourth sorting the ordered plurality of customer records resulting from the third sorting in to an order where the customer records having the same first discretized attribute scores are further sorted based on the assigned second discretized attribute scores associated with the second attribute;
   e) means for fifth sorting the ordered plurality of customer records resulting from the fourth sorting in to an order based on the attribute values associated with at least the first attribute and the second attribute, until customer records, which have different attribute values associated with at least the first attribute or the second attribute, have been sorted to different ranks;
   f) means for assigning an evaluation score to each customer record based on the rank of each customer record after the fifth sorting and independent of the discretized attribute scores; and g) means for identifying the high value customers by selecting the customer records that having the highest assigned evaluation scores.

12. A computer system for evaluating a plurality of customer records stored in a computer database to identify high value customers to be targeted by a customer retention or reward program, each customer record having at least a first attribute and a second attribute, each of the first attribute and the second attribute having an associated attribute value, the computer system comprising:

a processor; and a memory coupled to the processor, the memory having stored therein sequences of instructions, which, when executed by the processor, cause the processor to perform the steps of:

first sorting the plurality of customer records based on the first attribute and assigning a first discretized attribute to each customer record where the first discretized attribute is based on the sorted rank of the customer record;

second sorting the plurality of customer records based on the second attribute and assigning a second discretized attribute to each customer record where the second discretized attribute is based on the sorted rank of the customer record;

third sorting the plurality of customer records in to an order based on the assigned first discretized attribute scores associated with the first attribute;

fourth sorting the ordered plurality of customer records resulting from the third sorting in to an order where the customer records having the same first discretized attribute scores are further sorted based on the assigned second discretized attribute scores associated with the second attribute;

fifth sorting the ordered plurality of customer records resulting from the fourth sorting in to an order based on the attribute values associated with at least the first attribute and the second attribute, until customer records, which have different attribute values associated with at least the first attribute or the second attribute, have been sorted to different ranks;

assigning an evaluation score to each customer record based on the rank of each customer record after the fifth sorting and independent of the discretized attribute scores; and identifying the high value customers by selecting the customer records that having the highest assigned evaluation scores.

13. An article, for use in evaluating a plurality of customer records stored in a computer database to identify high value customers to be targeted by a customer retention or reward program, each customer record having at least a first attribute and a second attribute, each of the first attribute and the second attribute having an associated attribute value, the article comprising:

at least one sequence of machine readable instructions in machine readable form, wherein execution of the instructions by one or more processors causes the one or more processors to perform the steps of:

first sorting the plurality of customer records based on the first attribute and assigning a first discretized attribute to each customer record where the first discretized attribute is based on the sorted rank of the customer record;

second sorting the plurality of customer records based on the second attribute and assigning a second discretized attribute to each customer record where the second discretized attribute is based on the sorted rank of the customer record;

third sorting the plurality of customer records in to an order based on the assigned first discretized attribute scores associated with the first attribute;

fourth sorting the ordered plurality of customer records resulting from the third sorting in to an order where the customer records having the same first discretized attribute scores are further sorted based on the assigned second discretized attribute scores associated with the second attribute;

fifth sorting the ordered plurality of customer records resulting from the fourth sorting in to an order based on the attribute values associated with at least the first attribute and the second attribute, until customer records, which have different attribute values associated with at least the first attribute or the second attribute, have been sorted to different ranks;

assigning an evaluation score to each customer record based on the rank of each customer record after the fifth sorting and independent of the discretized attribute scores; and identifying the high value customers by selecting the customer records that having the highest assigned evaluation scores.

* * * * *